L. S. ROBBINS.
STONE POLISHER.
No. 12,766.                    Patented Apr. 24, 1855.
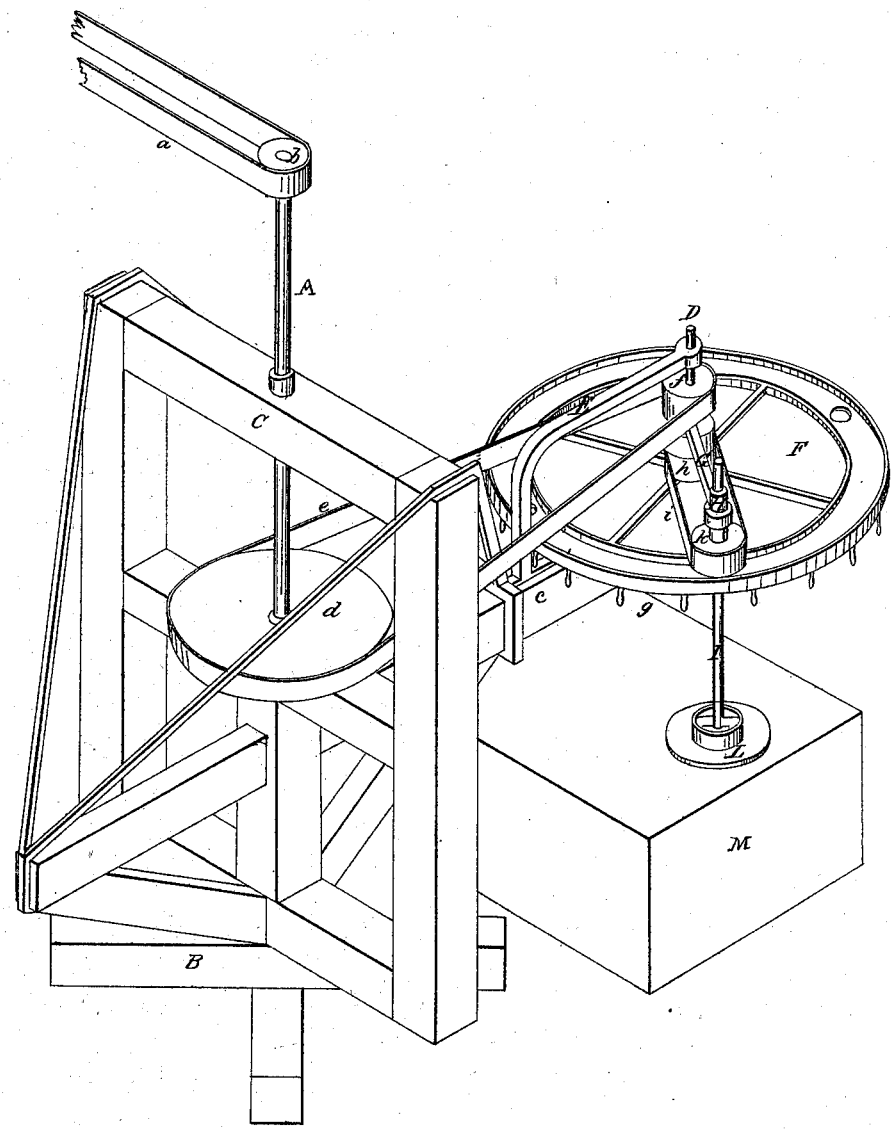

UNITED STATES PATENT OFFICE.

LOUIS S. ROBBINS, OF NEW YORK, N. Y.

MACHINE FOR POLISHING STONE.

Specification of Letters Patent No. 12,766, dated April 24, 1855.

*To all whom it may concern:*

Be it known that I, LOUIS S. ROBBINS, of the city, county, and State of New York, have invented certain new and useful Improvements in Machines for Smoothing or Polishing Stone or other Substances; and I hereby declare that the following is a full, clear, and exact description of the same, reference being had to the accompanying drawing, making part of this specification and representing a perspective view of a stone-polishing machine with my improvements.

The nature of my invention consists in a new arrangement, and combination of machinery for the purpose of rubbing down, finishing, or polishing the surfaces of stone or other substances by attrition or friction as will be presently described.

A vertical shaft (A), supported in a bearing at its upper end, rests in a socket or step in the bed piece B and derives a rotary motion from the power employed, by means of the band $a$, and fixed pulley $b$; this shaft also forms the axis of a crane or derrick (C) which moves freely thereon, and is constructed in any suitable manner with a jib or lateral projection $c$ properly braced, and stayed.

A vertical shaft (D) has its bearings in a socket or step near the outer extremity of the jib $c$, and in a bent arm E proceeding from and securely attached to the upper side of the jib; it derives a rotary motion from the shaft A, by means of the large fixed pulley $d$, the band $e$, and small fixed pulley $f$.

A large horizontal wheel (F) has for its axis the shaft D, upon which it moves freely. Upon its periphery it has projecting handles ($g$) by which it is moved with facility by an attendant.

A radial arm (G) has also for its axis the shaft D, and traverses freely thereon; it extends to the periphery of the wheel F, and affords near its outer extremity a bearing for the vertical sleeve H, which has also a bearing in the wheel F.

A spindle (I) plays vertically in the sleeve H, having a longitudinal groove corresponding with a feather upon the inside of the sleeve, to its lower end a chuck or holder (L) is attached, by an universal joint; a piece of stone or other material, suitable for a rubber or polisher is fixed to the under side of the holder L by any convenient means; it derives a rotary motion from the shaft D by means of the fixed pulley $h$, band $i$, and fixed pulley $k$, upon the sleeve H.

Any required number of revolving rubbers can be used upon the periphery of the wheel F by increasing the number of radial arms, and giving motion to them by means of bands, and pulleys either direct from the shaft D or from one to the other. The rubber L is self-adjusting to the surface to be acted on, by means of the universal joint by which it is attached to the spindle I, and the vertical play of the said spindle in the sleeve H.

The wheel F answers a two fold purpose. It affords a ready and convenient means in connection with the crane C of moving the revolving rubber to any part of the surface where it may be required to act, and gives a second bearing to the revolving sleeve H by which much strain is avoided.

Having thus described the construction and arrangement of the various portions of the machine that I find to be most convenient in practice I proceed to explain its operation upon a block of stone (M) previously dressed, and placed upon a suitable platform or bed.

Motion being communicated from the prime mover by means of the bands, pulleys, and shafts before described, the holder L with a suitable piece of stone attached is rapidly revolved, while bearing upon the surface of the block M by its own gravity; water and sand being applied in proper quantity and in any convenient manner, an attendant moves the rubber over any portion of the surface in the direction of the arcs of the circles having their centers in A and D or in any of their combinations, with ease and facility. He is thus enabled to accomplish what cannot be done by any of the contrivances now in use, the necessarily rapid motion of the wet rubber upon the stone causing an adhesion between them, to overcome which great force is required.

I do not claim the use of a revolving self-adjusting polisher or grinder or the manipulating apparatus separately considered, but

What I claim as my invention and desire to secure by Letters Patent is—

The manipulating apparatus (consisting of the shaft A, crane C, radial arm G and wheel F as above described) in combination with the revolving and self adjusting rubber or polisher constructed and arranged
5 substantially in the manner set forth and for the purposes specified.

In testimony whereof I have hereunto signed my name this 4th day of November 1854.

LOUIS S. ROBBINS.

Witnesses:
  E. R. MASON,
  JOHN M. EAGER.